United States Patent [19]

Kelly et al.

[11] Patent Number: 4,710,929
[45] Date of Patent: Dec. 1, 1987

[54] MODEM USE MONITOR

[75] Inventors: Robert J. Kelly, Old Tappan; Tadhg Kelly, Randolph, both of N.J.

[73] Assignee: Communication Devices, Inc., Clifton, N.J.

[21] Appl. No.: 797,166

[22] Filed: Nov. 12, 1985

[51] Int. Cl.$^4$ .................. H04M 3/08; G06F 11/00
[52] U.S. Cl. .................................. 371/22; 371/15; 379/1; 379/93; 375/10
[58] Field of Search ............... 371/22, 15, 29, 5, 60; 375/10; 370/13; 179/175.2 C, 175.3 F, 2 DP; 340/825.06, 825.16, 825.5, 720; 364/200, 900; 379/1, 93

[56] References Cited

U.S. PATENT DOCUMENTS

| | | | |
|---|---|---|---|
| 3,829,618 | 8/1974 | Brandon | 179/175.2 C X |
| 4,055,808 | 10/1977 | Holsinger | 375/10 X |
| 4,215,243 | 7/1980 | Maxwell | 179/2 DP |
| 4,385,384 | 5/1983 | Rosbury | 371/22 |
| 4,446,458 | 5/1984 | Cook | 340/825.06 |
| 4,545,011 | 10/1985 | Lyon | 371/29 X |

Primary Examiner—Jerry Smith
Assistant Examiner—Robert W. Beausoliel, Jr.
Attorney, Agent, or Firm—Siegmar Silber

[57] ABSTRACT

A modem use monitor (MUM) utilizable with one or more groups of modems is disclosed which modems, in turn, serve a rotary hunt arrangement of telephone lines for data communications. For analytical purposes, for each modem there is an intercept for providing a data carrier detect signal to central processor. The monitoring of the signal is provided on a periodic basis, generally every five seconds, and an indication of such response is provided periodically, generally each minute. The modems within each group are numbered and have correspondingly numbered registers for storing the responses for each modem in number sequence. The central processor has the additional function of examining the registers upon acquisition of each response and ascertaining if all modems lower in the numbered sequence have an indication of data carrier detect present. The MUM also formulates a histogram for recording all responses for a given period, which histogram shows the modems with data carrier detect present, modems with data carrier detect absent, and modems answering out-of-sequence. The histogram material is readily interpreted so that modem defects such as a ring no answer condition or lock-up condition can be identified.

28 Claims, 4 Drawing Figures

MODEM USE MONITOR

BACKGROUND OF THE INVENTION

1. Field of the Invention

The present invention is related to the monitoring and analysis of a quantity of modems, and more particularly to a microcomputer-based system that provides modem use information. Such information is provided in the form of a display and in the form of recorded data obtained directly or derived from the monitoring activity. The recorded data or histogram shows the in-use condition of each modem. From the histogram, one can determine which modems in the system are faulty, and whether too many or a sufficient number or an insufficient number of modems have been employed.

2. Information Disclosure Statement

In preparation for this application two separate pre-examination searches were performed. The first search was conducted in classes 346/33R, 33M, 33MC; and 375/8, and 10 and uncovered the following patents:

| U.S. Pat. No. | Inventor | Date of Issue |
|---|---|---|
| 3,286,272 | L. Dege, et al. | 11/15/66 |
| 3,293,605 | L. Moore | 12/20/66 |
| 3,371,349 | T. J. Schinner, et al. | 2/27/68 |
| 3,414,905 | M. F. O'Brien, et al. | 12/3/68 |
| 3,491,340 | R. L. Richman, et al. | 1/20/70 |
| 3,566,399 | F. E. Weld | 2/23/71 |
| 3,728,680 | L. Upshur | 4/17/73 |
| 3,956,601 | H. Harris, et al. | 5/11/76 |
| 4,047,155 | A. Miller | 9/6/77 |
| 4,471,348 | C. London, et al. | 1/1/85 |

The patents to Upshur, '680 and O'Brien et al. '905 teach the printing out of operating conditions for the looms of a textile mill. In Upshur '680 the system provides for the causes of loom stops, namely, filling stops, warp stops, warp out, and mechanical breakdowns. These stoppages are communicated through a binary code to a computer which indicates the cause of the stoppage. The computer has the capability of integrating the loom stations and of ascertaining the condition thereof. The computer further has the associated memory to retain status so that if a filling or warp stop has occurred, it is recorded whether or not the condition has presently cleared. The patent describes the recordation of loom data in the form of reporting cards. These cards are further used to provide weaving loom efficiency as well as other operating data.

In O'Brien et al., a similar textile application for computerized monitoring is provided. Here the reporting is through a record reflected by a scanner associated with a system having voltage signals provided to a patchboard. The description of a permanent record of the causes of shutdowns of the looms being monitored is described. This monitoring is taught as useful for recording downtime of machines other than textile looms.

In Shinner et al. '349, the disclosure teaches a device providing time and event printout of a plurality of circuit breakers which are monitored on a timed basis. Of particular interest in this disclosure is the time and date print unit and the operational information provided. Within the operating section the checking of the operation of the printer to determine if the printer is free of malfunctions is described.

In London et al. '348, a device is shown which, under the control of the microprocess control central processor, a number of analog input signals are scanned. The operation of the scanner is described together with the elements of the monitoring system and the description of the display.

A universal data recording system invented by Arthur Miller teaches display means on a plurality of terminals. In this invention an interrogation is conducted of various detector means.

The second search, was conducted in the following classes, 179/2DP; 375/8 and 10; 340/825.06, 825.16, 825.5, and 722; 364/300; 370/13; 371/5, 15, 22 and 60.

The search uncovered the following patents:

| U.S. Pat. No. | Inventor | Date of Issue |
|---|---|---|
| 4,498,186 | Hwang et al (AT&T Bell) | 2/5/85 |
| 4,398,299 | Darling et al (AT&T Bell) | 8/9/83 |
| 4,398,297 | Hwang et al (AT&T Bell) | 8/9/83 |
| 4,393,508 | Boudalt (U.S. Philips) | 7/12/83 |
| 4,385,392 | Angell et al | 5/24/83 |
| 4,385,384 | Rosbury et al (Rascal Data) | 5/24/83 |
| 4,015,206 | Huntley (GTE Lenkurt) | 3/29/77 |
| 3,956,601 | Harris et al (Paradyne Corp) | 5/11/76 |
| 3,952,163 | Couturier et al (Genl Data Commm) | 4/20/76 |
| 3,743,938 | Davis (General Data Comm) | 7/3/73 |
| 3,622,877 | MacDavid et al (Sanders Assoc) | 11/23/71 |
| 3,245,066 | Mattlet (Intnatl Std Elec Corp) | 4/5/66 |
| 3,225,205 | Berkin (IBM) | 12/21/65 |
| 3,097,353 | Carter (Epsco Inc) | 7/9/63 |
| 2,786,988 | Bergman (LM Ericson) | 3/26/57 |

In the patent to Courturier et al '163, a modem tester is taught in which a frequency division multiplexing transmitter/receiver is described. The operational teachings are described by reference to the waveform diagrams.

In Davis '938, the remote receiver control circuits response to carrier frequency signal is taught.

In Hwang et al '186 the section entitled "Communication Processing" teaches transmitting an acknowledgement, and the flag setting capability of the DDU upon receiving text.

In Rosbury et al '384 a device is described as containing tests for modems, including selftesting in response to the self-test enable (STE) command and end-to-end testing initiated by the tast pattern enable (TPE). The patent further teaches the logic states for modem operating conditions and descirbes information available for determining status such as modem signal quality.

The patent to Harris et al '601 teaches a modem test signal generator and the modem integrity signal derived therefrom.

In the Angell et al '392 patent, the logic operation of a ROM is taught, which ROM compares receive data with transmit data.

The MacDavid et al '877 patent teaches checking modems using a bit test sequence generator and a comparison of the same to a reference bit sequence generator.

The pertinent aspects of the searches have been discussed hereinabove so as to conform with the full disclosure requirements.

SUMMARY

A modem use monitor (MUM) is disclosed which is utilizable with one or more groups of modems for analyzing modem defects of the individual modems. Typically, a rotary hunt arrangement of telephone lines for data communications is sequentially served by several modems. For analytical purposes, an intercept is provided to receive a data carrier detect signal from each modem.

A central processor is used to process the data carrier signals from each of the modems, which processor is responsive to the presence and absence of the signals. The monitoring of the signal is provided on a periodic basis, generally every five seconds, and an indication of such response is provided periodically, generally each minute. The modems within each group are numbered and have correspondingly number registers for storing the responses for each modem in number sequence. The central processor has the additional function of examining the registers upon acquisition of each response and ascertaining if all modems lower in the numbered sequence have indication of data carrier present. The MUM also formulates a histogram for recording all responses for a given period, which histogram shows the modems with data carrier present modems with data carrier absent, and modems answering out-of-sequence. The histogram material is readily interpreted so that modem defects such as a ring no answer condition and a lock-up condition can be identified.

In the MUM, the central processor further computes the modem utilization factor in Erlangs according to the following formula:

$$\frac{N_1 + N_2 + N_3 \ldots N_{60}}{60}$$

wherein  $N_1$ = number of modems "ON" during minute 1
$N_2$ = number of modems "ON" during minute 2
$N_3$ = number of modems "ON" during minute 3
.
.
.
$N_{60}$ = number of modems "ON" during minute 60

An additional feature includes a memory for storing summarized information from the registers and provides a 24-hour summary chart listing, for each hour, $N_1, N_2, N_3 \ldots N_{60}$ so that an overview of the activity for each day is displayed. A yet further additional feature is a display panel for displaying the data carrier detect signal status for each modem. The display panel has a light emitting diode for each modem which, when illuminated, shows the presence of data carrier detect at the modem.

OBJECTS OF THE INVENTION

Is is an object of the present invention to provide a modem use monitor to analyze the performance of a quantity of modems, which monitor is simple and easy to use.

It is yet another object of the present invention to provide a modem use monitor to analyze the performance of a quantity of modems, which monitor generates a histogram showing the status of each of the modems.

It is yet another object of the present invention to provide a modem use monitor, which monitor can be utilized with several groups, each group serving a distinct rotary hunt arrangement of telephone lines.

It is a yet object of the present invention to provide a modem use monitor to analyze the performance of a quantity of modems, which monitor generates a 24-hour summary of modem utilization.

It is a still yet further object of the present invention to provide a modem use monitor to analyze the performance of a quantity of modems, which monitor includes a display of data carrier detect signal presence at each modem.

It is a still yet further object of the present invention to provide a modem use monitor to analyze the performance of a quantity of modems, which monitor calculates the modem utilization factor in Erlangs.

Other objects and features of the invention will become apparent as the drawings which follow are understood by reading the corresponding description thereof.

DESCRIPTION OF THE PREFERRED EMBODIMENT

In general terms, the Modem Use Monitor (MUM) System of the present invention is applied to quantities of modems which, in turn, are connected to a rotary hunt group of telephone lines. The MUM system enables one to isolate problems and ascertain (1) whether the problems are in the modems or the telephone company lines; (2) the nature of the modem problem; (3) indication if too many or too few modems are dedicated to the application; and, (4) indication of trends as to increasing or decreasing use of the overall application.

The telephone rotary hunt group is a single telephone number (first line) with circuitry providing access to a number of associated telephone lines. When the number of the first line is dialed, the ciruitry searches for an unused telephone line in the group. When an empty line is found, the incoming call is connected thereat and the hunt group processes the next call starting again at the first line. For data communications, automatically answering modems are usually connected sequentially to the telephone lines in a rotary hunt group. If the modem is ready to receive data, the telephone ring is automatically answered and the caller is connected to the modem. Because the automatic answering systems—modems, rotary hunt groups and computers—are by design largely unattended, equipment failures or insufficiencies are often unnoticed. Problems are often only brought to light when users, who have been repeatedly frustrated in their attempts to gain access, report the problem. Of the problems attributable to modems, besides insufficiencies, there are two main equipment failure categories, namely (1) a "ring-no-answer" condition, and (2) "lock up" or no disconnect after caller has disconnected. Of the equipment failures the ring-no-answer condition is the most severe as the unattended telephone equipment will continue to ring the modem whenever it appears in the hunt sequence. With a ring-no-answer condition, the user ringing the defective modem will not be able to gain access to the computer.

Conversely, the lock-up condition only removes from service the modem and telephone line affected, while the user can gain access through adjacent modems and lines. Thus, the lock-up answer condition reduces user access and system efficiency.

When a new service is initially planned, an estimate of the incoming traffic must be made to determine the required number of telephone lines, automatic answering modems, and computer ports required to satisfactorily handle the service. If this quantity of equipment is estimated low, then some of incoming callers will receive busy signals. If the amount of equipment is estimated high, then unneeded costs are incurred because of equipment and telephone lines sitting idle.

Figure 1:
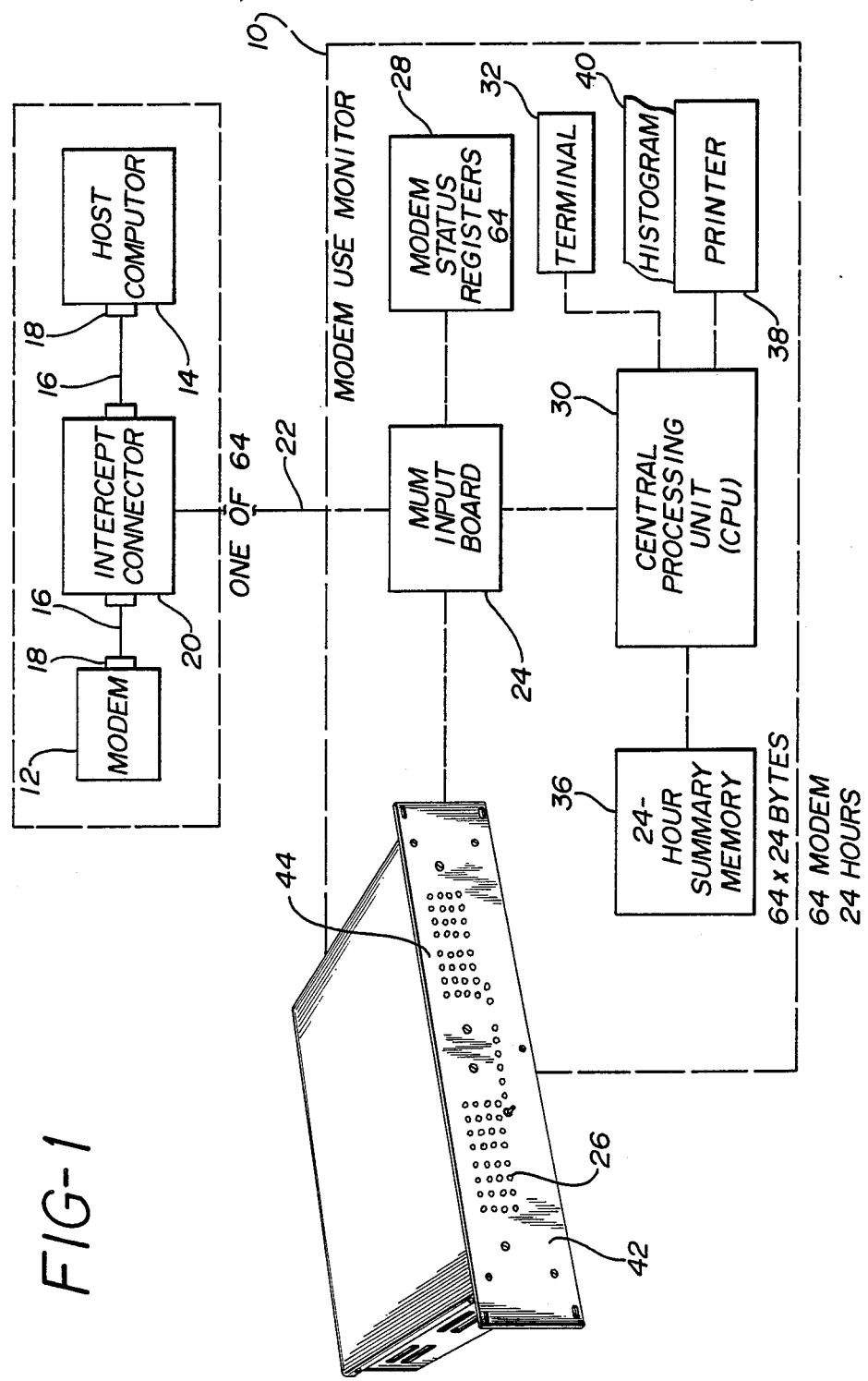
FIG. 1 is a system block diagram of the modem use monitor of the present invention and further shows the relationship among the modem, the intercept connector, the host computer, and the modem use monitor.

Referring now to FIG. 1, a system block diagram is shown with the modem use monitor (MUM) referred to generally by the numeral 10. In automatic answering systems as described above, a modem or data communication equipment (DCE) 12 is connected to the host computer or the data terminal equipment (DTE). 14. Usually, the modem and the host computer are connected through a standard cable 16 with 25-pin connectors (RS-232) 18 at either end thereof. With some degree of standardization in the modem field, pin 8 of the RS-232 is a data carrier detect (DCD) line. Although more than one intercepted line could be used for the current or similar system, the best mode descirbed herein is operated with the interception on only the DCD signal in a manner which is transparent to the DTE computer. All MUM data is derived from this input. To this end, an intercept connector 20 is placed mediate the ends of cable 16 and branches the DCD signal 22 to the MUM input board 24 of the MUM 10. While only a single modem 12 and intercept connector 20 are shown, each MUM 10 can accommodate inputs from up to 64 modems. As wil be described in greater detail hereinbelow, the MUM 10 may be used to monitor several (up to eight) rotary hunt groups.

Upon receiving the DCD input, the MUM input board 24, in turn, provides the signal to a panel display of light emitting diodes 26, to a modem status register 28, and to a microcomuter or central processing unit (CPU) 30. The CPU 30 is also provided with information through terminal 32, particularly time and date information to set the real time clock and calendar portion of the CPU. After processing the data, information as to performance of each modem being monitored is provided to the 24-hour summary memory 36 and to the printer which, in turn, provides a summary chart (not shown).

Figure 2:
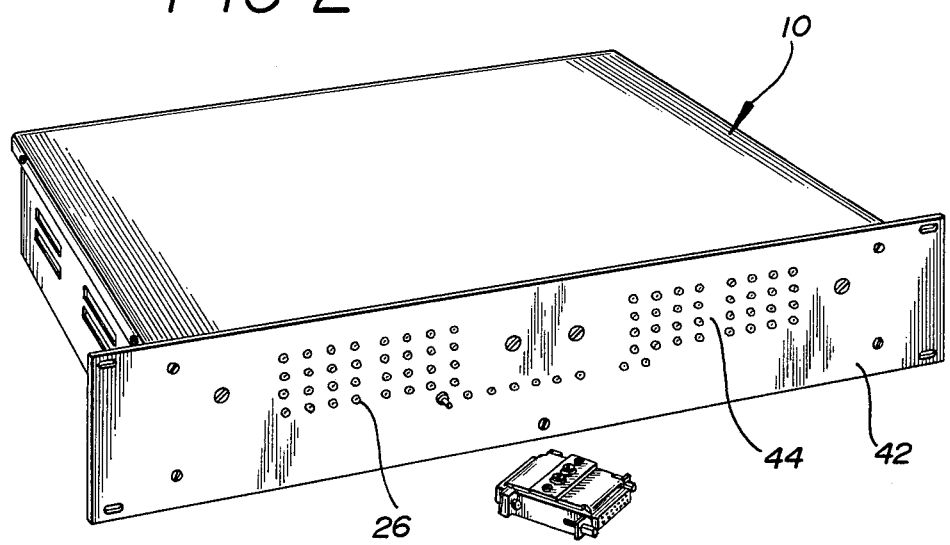
FIG. 2 is a front view of the modem use monitor and particularly show the front panel array of indicators.

Reference is now made to FIG. 2 in which further details of the modem use monitor 10 are shown. The front panel 42 has an array 44 of the light emitting diodes (LED) 26 with each LED identified as to a particular modem monitored. The array 44 is costructed so that, when a particular DCD signal is received, the corresponding LED is illuminated. This indicates that the modem is in use. Besides displaying the in-use condition of the modem, the MUM 10 takes the information and places the data into the modem status register 28 which, in turn, is compiled as histogram 40.

Figure 3:
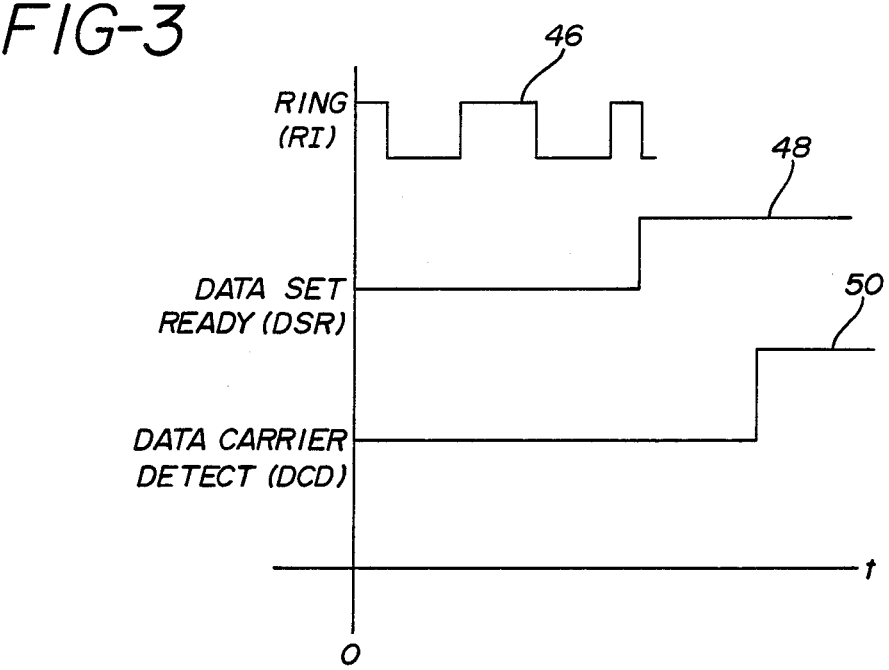
FIG. 3 is a timing diagram showing the relationship between the ring indicator signal and the data set ready and data carrier detect signals; and, FIG. 4 is a histogram for three groups of modems, numbered 1 through 13; 14 through 34; and 35 through 64; showing unit-time fields in which initiation-of-use, continuation-of-use, and improper-use symbols are imprinted; and, upon completion of the histogram, the modem utilization factor is imprinted adjacent each group.

To further understand the sequence of signal applications, in FIG. 3, the timing diagram for the modem use monitor is provided. The relationship of ring indicator (RI) 46 to data set ready (DSR) 48 and data carrier detect (DCD) 50 is shown. Under normal operating conditions, upon automatic answering the RI signal 46 ceases and the DSR signal 48 is used to ascertain the compatibility of the transmitting and receiving devices. When the compatibility of devices is ascertained, the DCD signal 50 locks in and data transmission ensues. An understanding of the relationship among the RI signal 46, DSR signal 48 and DCD signal 50 is particularly important to following the interpretation of the histogram record described below.

Figure 4:
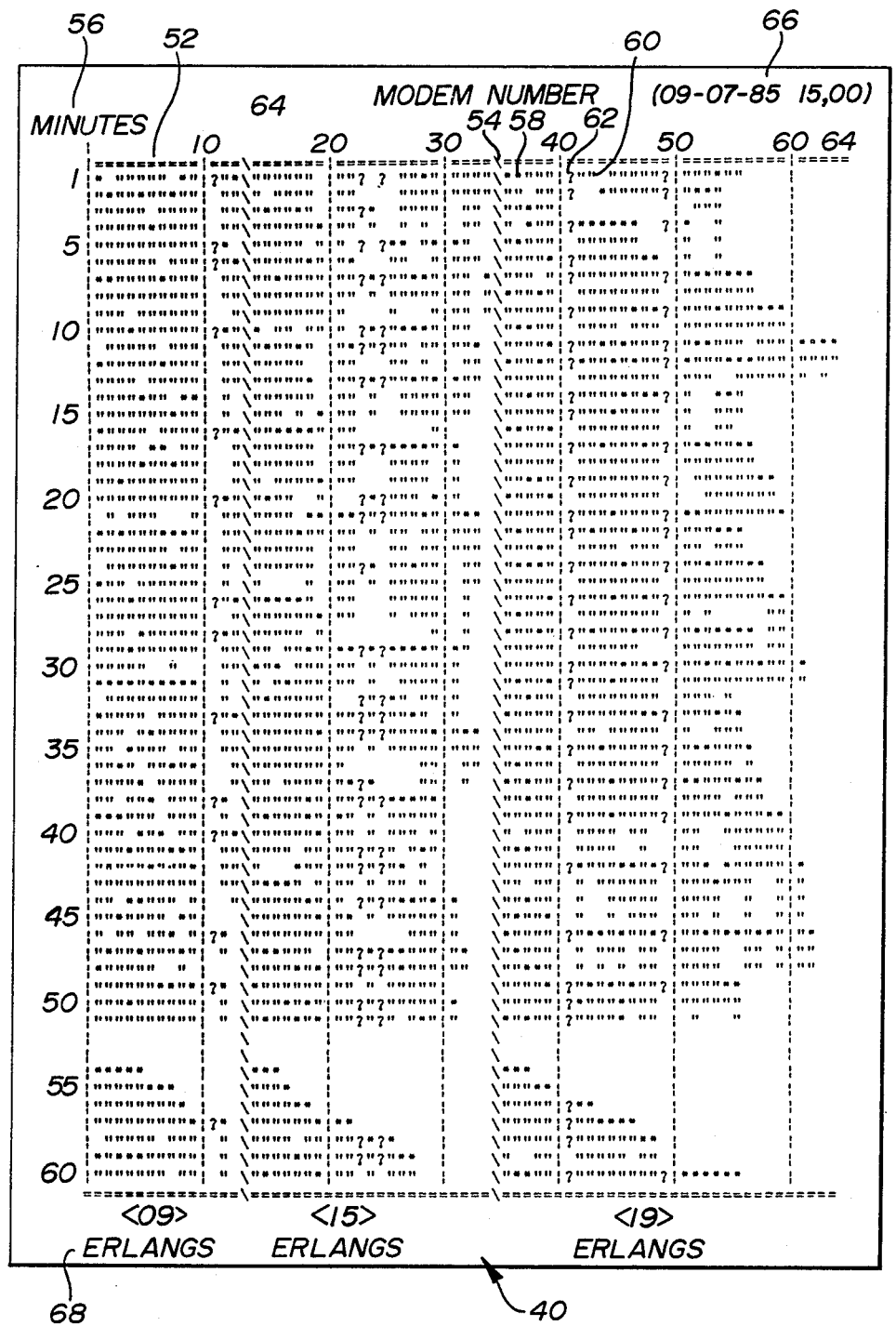

Referring now to FIG. 4 a histogram 4 is shown. The individual modem units are numbered sequentially along the x-axis and separated into rotary hunt groups. In the histogram 70, the first group 52 is comprised of modems 01 throug 13 with a group separator 54. The y-axis provides the time in reporting intervals or, in the case at hand, minutes 56. Although minutes are used, for convenience, the display could be provided for smaller or larger time intervals. In the histogram 40, the numbered units and the minutes define unit-time fields for monitoring modem activity. After the "handshaking" procedure is completed and the DSR signal 48 verifies component compatibility, the DCD signal 50 is initiated. If in sequentially scanning of the modems, the use of a specific modem is initiated (no use of modem in prior minute), then an imitation-of-use symbol or asterisk 58 is imprinted in the corresponding unit-time field. Similarly, if in sequential scanning of the modems, the use of a specific modem is continued, then a continuation-of-use symbol or quote mark 60 is imprinted in the corresponding unit-time field. Over an extending period of time, if continuation-of-use symbol 60 persists, a possible lock-up condition is revealed. The MUM unit 10 is programmed to review proper initiation by looking back over lower-in-sequence modems to check the register to determine whether a lower numbered modem should have responded, but because of failure did not. If it is found that a lower-in-sequence modem should have responded, then an improper-use symbol or question mark 62 is imprinted in the unit-time field of the lower-in-sequence modem. This modem can then be checked for ring-no-answer or modem-locked-up conditions. Blank 64 unit-time fields on histograms 40 show that during the time represented by the field of modem was not in service. In addition to the above diagnostic information, the MUM 10 is structured to provide date/hour indication 66 Erlangs of use 68, the latter of which is described in more detail below. The histogram 40 of FIG. 4, by way of example, consists of three subhistograms, namely, Group I for modems 1 throug 13; Group II, modems 14 through 34; and Group III, modems 35 through 64.

In operation, the MUM unit is utilized for analyzing modem defects by the method described hereinbelow.

The modems are formed into one or more groups thereof, and within each group, and the modems sequentially serve a rotary hunt arrangement of telephone lines for data communications purposes. When in use, each modem has a data carrier detect signal present. The method comprises the steps of:

a. intercepting the data carrier signal for each modem;

b. sequentially processing within each group each data carrier detect signal within recurring predetermined time periods, typically one minute intervals, to provide an indication of the presence or absence of the data carrier signal and, within the predetermined time period, repeating the sequential processing several times so as to validate the data initially accumulated;

c. storing in a register the data carrier detect signal status for each modem during each predetermined time period;

d. examining the register to corroborate that all lower-in-sequence modems were responsive to the data carrier detect signal status examination preferably in reverse sequential order; and, e. indicating in a histogram form non-use, initiation-of-use, continuation-of-use and improper use of each said modem and, additionally any of the following steps f. transferring to a memory data stored in the register;

g. clearing the register at the conclusion of the predetermined time period;

h. summarizing the modem activity for each 24-hour period on a 24-hour summary chart.

i. computing the modem utilization factor in Erlangs according to the following formula:

$$\frac{N_1 + N_2 + N_3 \ldots N_{60}}{60}$$

wherein  $N_1$ = number of modems "ON" during minute 1
$N_2$ = number of modems "ON" during minute 2
$N_3$ = number of modems "ON" during minute 3

$N_{60}$ = number of modems "ON" during minute 60 j. branching the intercepted data carrier detect signal for each modem to a panel; and, k. displaying at the panel typically by a light emitting diode for each modem, the data carrier detect signal status for each modem.

In the best mode of operation, it is preferable to, in step f. above, increment to memory whenever each data carrier detect signal is indicated as being present at a modem.

Although the best mode of the invention has been described herein in some detail, it has not been possible to include each and every variation. Those skilled in the art of modem use monnitors will be able to make slight variations in the arrangement suggested hereby without departing from the spirit of the invention and still be within the scope of the claim appended hereto.

What is claimed is:

1. A device for analyzing modem defects among a plurality of modems formed into one or more groups thereof, each said group of modems sequentially serving a rotary hunt arrangement of telephone lines for data communications, said device further receiving data carrier detect detect signals from each said modem said device comprising:

central processing means for processing the data carrier detect signals from each modem and, in turn, being responsive to the presence and absence of said signals, and providing responses on a periodic basis;

register means for storing said responses for each modem in numbered sequence;

said central processing means further for examining said register means upon acquisition of each said response and ascertaining if all modems lower in the numbered sequence have indication of data carrier detect present; and, histogram-forming means for recording all responses from said register means for a given period showing data carrier detect present, data carrier detect absent, and modem answering out-of-sequence;

whereby modem defects such as a ring no answer condition and a lock-up condition are apparent upon examination of the histogram.

2. A device as described in claim 1 wherein said central processing means further computes a modem utilization factor.

3. A device as described in claim 2 wherein said modem utilization factor is computed in Erlangs according to the following formula:

$$\frac{N_1 + N_2 + N_3 \ldots N_{60}}{60}$$

wherein  $N_1$ = number of modems "ON" during minute 1
$N_2$ = number of modems "ON" during minute 2
$N_3$ = number of modems "ON" during minute 3

$N_{60}$ = number of modems "ON" during minute 60

4. A device as described in claim 3 further comprising:

memory means for storing summarized information from said register means.

5. A device as described in claim 4 wherein said memory means is further providing a 24-hour summary chart listing, for each hour, $N_1$, $N_2$, $N_3$ . . . $N_{60}$.

whereby an overview of the activity for each day is displayed.

6. A device as described in claim 1 further comprising a display panel means for displaying the data carrier detect detect signal status for each modem.

7. A device as described in claim 6 wherein said display means has a light emitting diode for each modem which, when illuminated, shows the presence of data carrier detect detect at said modem.

8. A method of analyzing modem defects among a plurality of modems formed into one or more groups thereof, the modems within each said group sequentially serving a rotary hunt arrangment of telephone lines for data communications purposes and having a data carrier detect signal present when in use, said method comprising the steps of:

a. intercepting said data carrier detect signal for each said modem;

b. sequentially processing within each group each said data carrier detect signal within recurring predetermined time periods to provide an indication of the presence and absence of the data carrier detect signal;

c. Storing in a register the data carrier detect detect signal status for each modem during each predetermined time period;

d. examining said register to corroborate that all lower-in-sequence modems were responsive to the data carrier detect signal status; and, e. indicating in a histogram form non-use, initiation-of-use, continuation-of-use and improper use of each said modem.

9. A method as described in claim 8 wherein the predetermined time period is one minute.

10. A method as described in claim 9 further comprising the steps of:

f. transferring to a memory data stored in said register;

g. clearing the register at the conclusion of said predetermined time period; and h. summarizing the modem activity for each 24-hour period on a 24-hour summary chart.

11. A method as described in claim 10 wherein the transferring includes the substep of incrementing the memory upon each data carrier detect detect signal indicated as present at a modem.

12. A method as described in claim 9 further comprises the step of:
  i. computing a modem utilization factor.

13. A method as described in claim 12 wherein said modem utilization factor is computed in Erlangs according to the following formula:

$$\frac{N_1 + N_2 + N_3 \ldots N_{60}}{60}$$

wherein  $N_1$ = number of modems "ON" during minute 1
$N_2$ = number of modems "ON" during minute 2
$N_3$ = number of modems "ON" during minute 3
.
.
.
$N_{60}$ = number of modems "ON" during minute 60

14. A method as described in claim 8 wherein said examining step reviews the lower-in-sequence modems in reverse sequential order.

15. A method as described in claim 8 further comprising the steps of:
  j. branding the intercepted data carrier detect detect signal for each modem to a panel; and,
  k. displaying at the panel the data carrier detect detect signal status for each modem.

16. A method as described in claim 15 wherein said panel has a light emitting diode for each modem, which, when illumintaed, shows the presence of data carrier detect detect.

17. A method as described in claim 8 wherein step (b) is repeated a plurality of times within the predetermined time period to validate the data initially accumulated.

18. A method of forming a histogram for analyzing modem defects among a plurality of modems formed into one or more groups thereof, each said group of modems sequentially serving a rotary hunt arrangement of telephone lines, said method comprising the steps of:
  forming a chart showing a modem unit identification number along a first axis and time periods along a second axis defining unit-time fields to be monitored;
  imprinting an initiation-of-use symbol in a field representing the first period of use for a specific modem;
  imprinting a continuation-of-use symbol in a field representing uninterrupted succession of periods of use for a specific modem; and,
  imprinting an improper use symbol in a field fo a defective modem revealed upon examination of the status of lower-in-sequence modems from the field of a higher operating modem;
  whereby a defective modem is indicated which modem failure to answer or to release upon completion of previous call.

19. A method of forming a histogram as described in claim 18, wherein the modems serve data communications applications and monitors up to 64 modems.

20. A method of forming a histogram as described in claim 19 further comprising the step of imprinting a group separation symbol between fields of modems serving different rotary hunt group arrangements.

21. A method of forming a histogram as described in claim 20 further comprising the step of separating the histogram into as many as eight separate groups, shown as subhistograms, with the lowest numbered modem in each group forming a baseline for the subhistogram.

22. A method of forming a histrogram as described in claim 20 further comprising the step of computing and displaying the modem utilization factor for each group.

23. A device for analyzing modem defects among a plurality of modems formed into one or more groups thereof, each said group of modems sequentially serving a rotary hunt arrangement of telephone lines for data communications, said device further receiving data carrier detect detect signals from each said modem said device comprising:
  central processing means for processing the data carrier detect signals from each modem and, in turn, being responsive to the presence and absence of said signals by providing responses on a periodic basis and by computing a modem utilization factor;
  register means for storing said responses for each modem in numbered sequence;
  said central processing means further for examining said register means upon acquisition of each said response and ascertaining if all modems lower in the numbered sequence have indication of data carrier detect present; and,
  histogram-forming means for recording all responses from said register means for a given period showning data carrier detect present, data carrier detect absent, and modem answering out-of-sequence;
  whereby modem defects such as a ring no answer condition and a lock-up condition are apparent upon examination of the histogram.

24. A device as described in claim 23 wherein said modem utilization factor is computed in Erlangs according to the following formula:

$$\frac{N_1 + N_2 + N_3 \ldots N_{60}}{60}$$

wherein  $N_1$ = number of modems "ON" during minute 1
$N_2$ = number of modems "ON" during minute 2
$N_3$ = number of modems "ON" during minute 3
.
.
.
$N_{60}$ = number of modems "ON" during minute 60

25. A device as described in claim 24 further comprising:
  memory means for storing summarized information from said register means.

26. A device as described in claim 25 wherein said memory means is further providing a 24-hour summary chart listing, for each hour, $N_1, N_2, N_3 \ldots N_{60}$;
  whereby an overview of the activity for each day is displayed.

27. A device as described in claim 23 further comprising a display panel means for displaying the data carrier detect detect signal status for each modem.

28. A device as described in claim 27 wherein said display means has a light emitting diode for each modem which, when illuminated, shows the presence of data carrier detect at said modem.

* * * * *